US008210080B2

(12) United States Patent  
Tokiwa et al.

(10) Patent No.: US 8,210,080 B2
(45) Date of Patent: Jul. 3, 2012

(54) WORKPIECE CUTTING METHOD AND BAND SAW MACHINE

(75) Inventors: Toru Tokiwa, Kanagawa (JP); Isomi Washio, Kanagawa (JP); Shoji Aihara, Kanagawa (JP); Minoru Gotoh, Kanagawa (JP)

(73) Assignees: Amada Company, Limited, Kanagawa (JP); Amada Cutting Co., Ltd., Kanagawa (JP)

( * ) Notice: Subject to any disclaimer, the term of this patent is extended or adjusted under 35 U.S.C. 154(b) by 0 days.

(21) Appl. No.: 12/732,914

(22) Filed: Mar. 26, 2010

(65) Prior Publication Data

US 2010/0175530 A1 Jul. 15, 2010

Related U.S. Application Data

(62) Division of application No. 11/572,687, filed as application No. PCT/JP2005/013551 on Jul. 25, 2005, now Pat. No. 7,930,963.

(30) Foreign Application Priority Data

Jul. 26, 2004 (JP) .................................. 2004-217302
Mar. 31, 2005 (JP) .................................. 2005-105112

(51) Int. Cl.
*B23D 53/04* (2006.01)

(52) U.S. Cl. ............................... 83/789; 83/820; 83/661
(58) Field of Classification Search .................. 83/789, 83/820, 661
See application file for complete search history.

(56) References Cited

U.S. PATENT DOCUMENTS

| 3,225,801 | A | 12/1965 | Dunn et al. |
| 3,801,089 | A | 4/1974 | Fukugami et al. |
| 4,127,045 | A | 11/1978 | Blucher et al. |
| 4,766,790 | A | 8/1988 | Harris |
| 6,532,852 | B1 * | 3/2003 | Tsujimoto et al. ............. 83/661 |
| 7,654,184 | B2 | 2/2010 | Aihara et al. |
| 2006/0144202 | A1 | 7/2006 | Tokiwa et al. |

FOREIGN PATENT DOCUMENTS

| JP | 56-107825 | 8/1981 |
| JP | 1-170523 | 12/1989 |
| JP | 9-300131 | 11/1997 |
| JP | 2003-305613 | 10/2003 |

* cited by examiner

*Primary Examiner* — Kenneth E. Peterson
(74) *Attorney, Agent, or Firm* — Greenblum & Bernstein, P.L.C.

(57) ABSTRACT

A workpiece cutting method utilizing a band-saw machine, includes the following steps of: guiding tooth tips of an endless band-saw blade provided on the band-saw machine in a direction of a workpiece by a band-saw blade guiding apparatus; and applying vibrations to the band-saw blade in a cutting direction to the workpiece so as to perform cutting of the workpiece by a vibration applying unit provided on the band-saw blade guiding apparatus.

10 Claims, 9 Drawing Sheets

FIG. 3
(A)
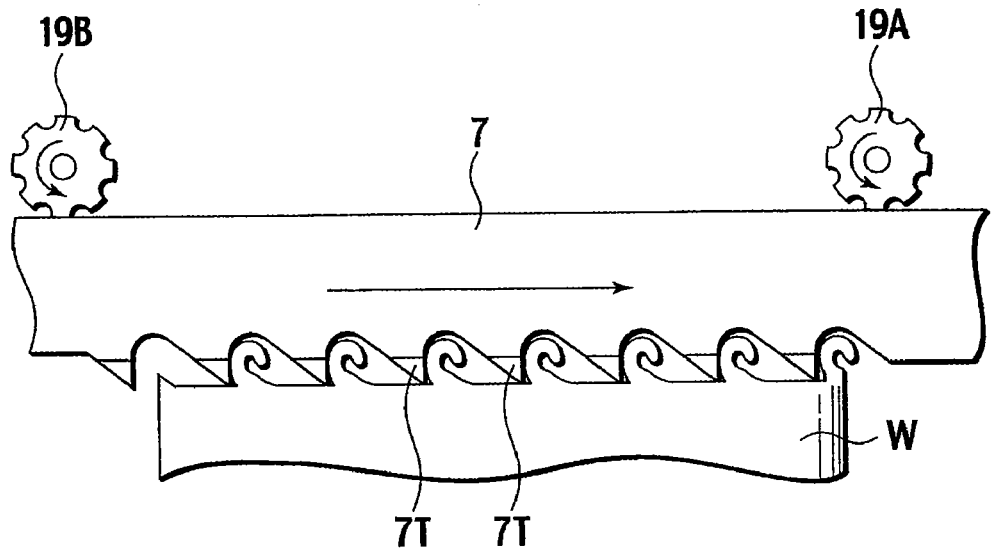
(B)
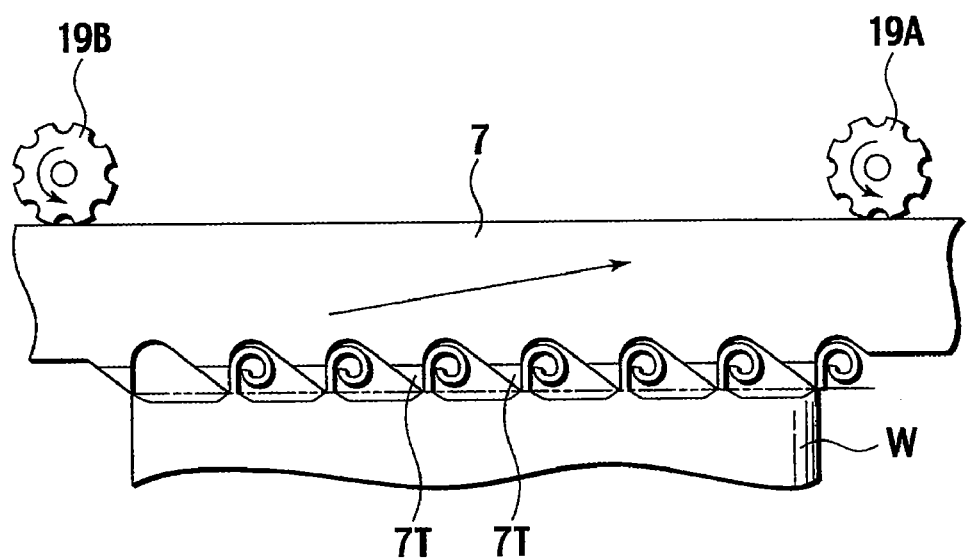

FIG. 5
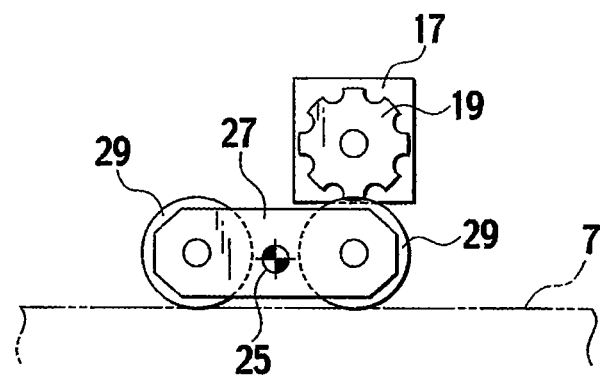
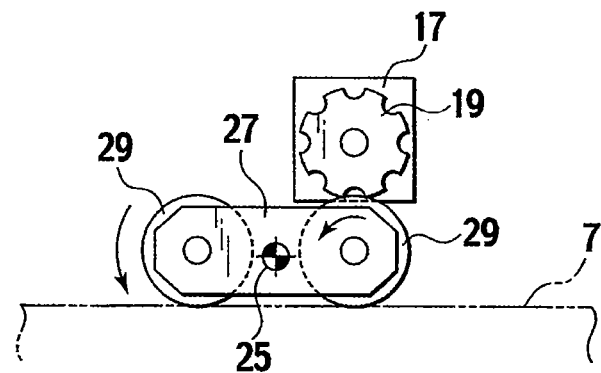
FIG. 6
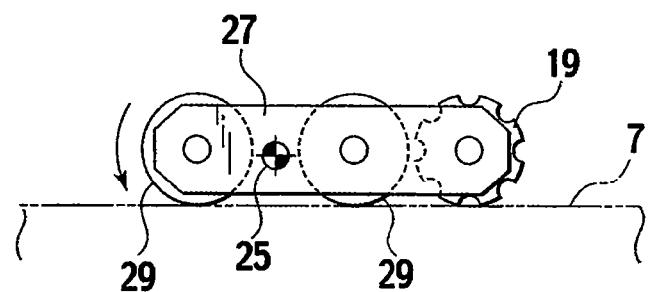
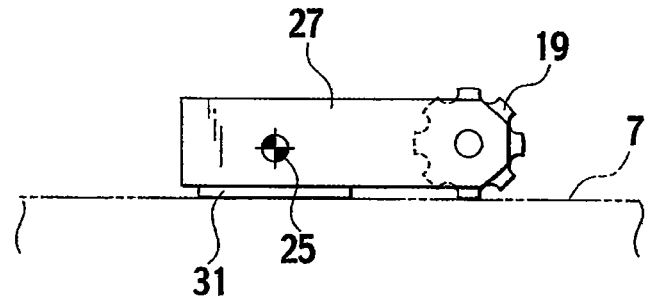

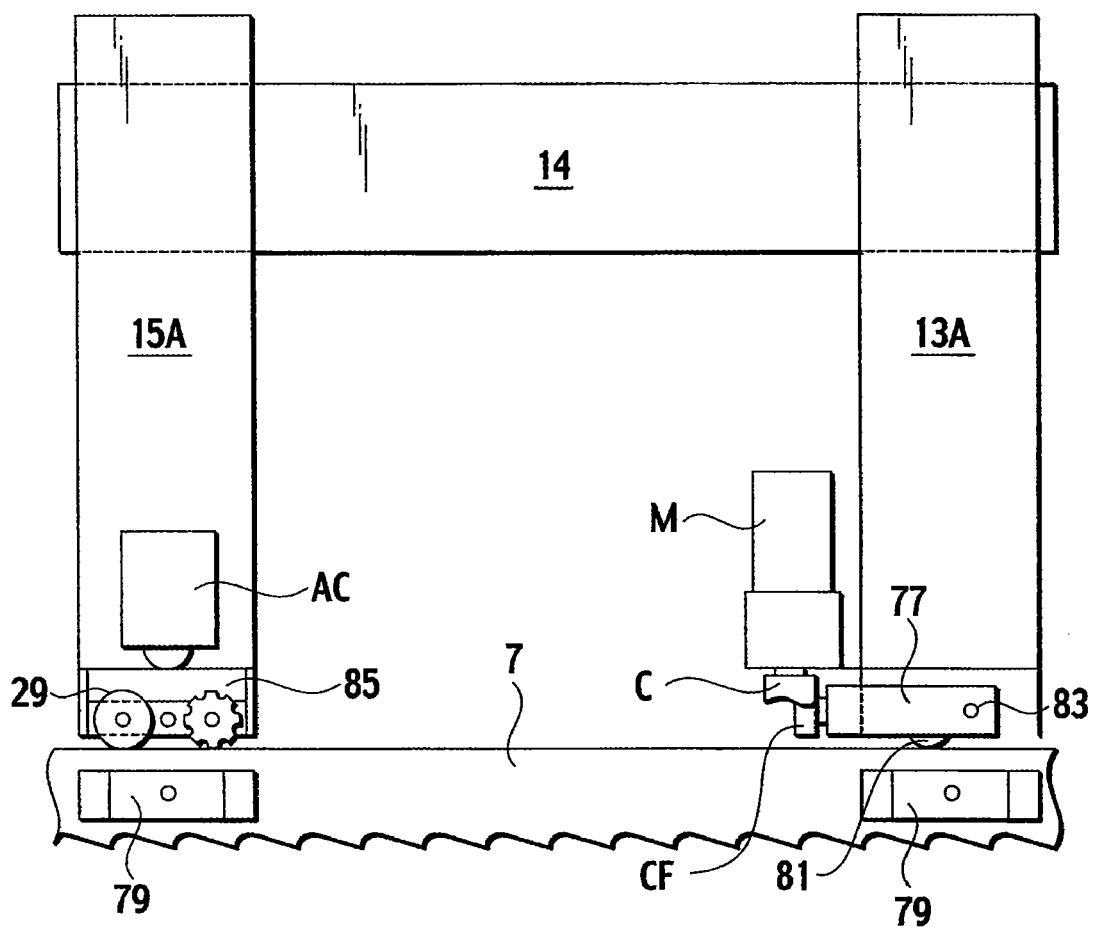

WORKPIECE CUTTING METHOD AND BAND SAW MACHINE

This application is a divisional application of U.S. patent application Ser. No. 11/572,687, filed Apr. 27, 2007, now U.S Pat. No. 7,930,936, which is a National Stage of International Application No. PCT/JP2005/013551, filed Jul. 25, 2005, and which claim foreign priority to Japanese Application 2005-105112, filed Mar. 31, 2005 and Japanese Application 2004-217302, filed Jul. 26, 2004, the disclosures of which are expressly incorporated herein by reference in their entireties.

DESCRIPTION

1. Technical Field

The present invention relates to a workpiece cutting method utilizing a band-saw machine including an endless band-saw blade and a band-saw machine used for the workpiece cutting method, and more particularly to a cutting method that applies vibrations in a cutting direction of a band-saw blade with respect to a workpiece for conducting application of vibrations to perform cutting of the workpiece and a band-saw machine including a vibration applying unit that applies vibrations.

2. Background Art

Types of band-saw machines include a horizontal band-saw machine and a vertical band-saw machine. A band-saw blade used in band-saw machines is configured in an endless manner, by joining both end portions of a band-shaped saw blade by welding. A technique of swinging cutting has been developed in order to reduce a cutting length to perform cutting of a workpiece, at the time of cutting work of a workpiece is performed using such an endless band-saw blade. This technique is disclosed in, for example, Japanese Patent Application Laid-open Publication No. JP-A S56-107825.

For example, in a horizontal band-saw machine, a workpiece is cut by the swinging cutting while alternately inclining a band-saw blade to a state of diagonally right down and diagonally left down. That is, cutting work is performed on a workpiece by alternately repeating right down inclination and left down inclination of a saw blade housing including the band-saw blade slowly to incline the band-saw blade in the state of diagonally right down or diagonally left down. There has also been developed a configuration where, when swinging cutting is performed, a band-saw blade is inclined in a state of diagonally right down and diagonally left down by moving a guide roller included in a band-saw blade guiding apparatus that performs guiding of the band-saw blade in a cutting direction. This technique is disclosed in, for example, Japanese Patent Application Laid-open Publication No. JP-A 2003-305613.

There is also a technique for adopting a configuration where a wave-shaped undulation is formed on a back portion of a band-saw blade for performing swinging cutting such as the one described above, and when a top portion of the undulation is positioned at one of band-saw blade guiding apparatuses, a bottom portion thereof is positioned at the other apparatus, to incline the band-saw blade to a state of orthogonally right down or orthogonally left down, thereby performing swinging cutting of a workpiece. This technique is disclosed in, for example, Japanese Patent Application Laid-open Publication No. JP-A H9-300131.

Generally, gear cutting work is performed to form a band-saw blade using a milling cutter in a gear cutting machine that is most suitable for mass production. Accordingly, a band-saw width precision of the band-saw blade (a degree of variations of values obtained by measuring many distances from a distal end of a tooth tip formed according to the gear cutting work to a back face of the band-saw blade) is determined depending on a precision of the gear cutting machine, a precision of the milling cutter and the like. However, the band-saw width precision of the band-saw blade obtained by the work has variations in a range from 0.03 to 0.05 mm, even if the blade is a favorable one.

Several hundred or more tooth tips are formed on one band-saw blade. A cutting amount per one tooth on the band-saw blade is examined below. When a height of a workpiece in a cutting direction is represented as Hmm, a pitch of tooth tips of the band-saw blade is represented as Pmm, a rotational velocity (sawing rate) of the band-saw blade is represented as Vm/min, and a cutting time is represented as tmin, the cutting amount amm per one tooth is expressed by the following equation.

$$a=(H \times P)/(1000 \times V \times t) \text{mm}$$

Next, in order to conduct specific calculations, representative samples are extracted from a cutting condition table described in a blade (band-saw blade) catalogue for year 2000 issued by AMADA Co. Ltd., Japan, who is the present applicant, and the calculations are performed.

(1) A pitch P of tooth tips of a band-saw blade conforming to S45C(JIS) φ100 is set to 7.3 mm.

Rotational velocity V of band-saw blade: 48 to 72 m/min
Cutting time t: 1.5 to 2.2 min
The minimum value of a cutting amount "a" per one tooth in this conditions is $$(100 \times 7.3)/(1000 \times 72 \times 2.2)=0.0046 \text{ mm,}$$

and the maximum value thereof is $$(100 \times 7.3)/(1000 \times 48 \times 1.5)=0.0101 \text{ mm.}$$

(2) A pitch P of tooth tips of a band-saw blade conforming to SUS304(JIS) φ500 is set to 19.5 mm.

Rotational velocity V of band-saw blade: 17 to 26 m/min
Cutting time t: 90 to 168 min
The minimum value of a cutting amount "a" per one tooth in the conditions is $$(500 \times 19.5)/(1000 \times 26 \times 168)=0.0022 \text{ mm,}$$

and the maximum value thereof is $$(500 \times 19.5)/(1000 \times 17 \times 90)=0.0064 \text{ mm.}$$

As understood from the above, an average cutting amount per one tooth of a band-saw blade is generally 0.01 mm or less.

However, as described above, the band-saw width precision of the band-saw blade includes variations in a range from 0.03 to 0.05 mm, even if the blade is a favorable one. That is, the cutting amount per one tooth is ⅓ or less of the band-saw width precision, where there is a problem that when cutting is performed in this state, only teeth with a relatively wide width of all the teeth including variations in band-saw width can work for cutting, and not all the teeth do not work.

It is easily conceived that teeth that move, but only gall a cutting face without removing chips, are present. Presumably, it is conceivable that the teeth that move in a galling manner generate uncomfortable noises and extra heat.

The present invention has been achieved in order to solve the problem, and an object of the invention is to provide a cutting method that can perform effective cutting by controlling a band-saw blade such that all teeth corresponding to a workpiece can cut in the workpiece, and a band-saw machine used in the cutting method.

DISCLOSURE OF THE INVENTION

To achieve the above object, a first aspect of the present invention provides a workpiece cutting method utilizing a band-saw machine, comprising steps of: guiding tooth tips of an endless band-saw blade provided on the band-saw machine in a direction of a workpiece by a band-saw blade guiding apparatus; and applying vibrations of the band-saw blade on the workpiece in a cutting direction to perform cutting of the workpiece by a vibration applying unit provided on the band-saw blade guiding apparatus.

A second aspect of the present invention provides the workpiece cutting method according to the first aspect, wherein the vibrations in the cutting direction are applied to the band-saw blade in a state that respective vibration applying units provided on a pair of the band-saw blade guiding apparatuses are synchronized with each other or the respective vibration applying units are asynchronous with each other.

A third aspect of the present invention provides the workpiece cutting method according to the first aspect or the second aspect, wherein an amplitude of the vibrations of the band-saw blade in the cutting direction is in a range from about 0.03 to 0.5 mm, and a frequency of the vibrations is in a range from several Hz to several hundreds Hz.

To achieve the above object, a fourth aspect of the present invention provides a band-saw machine comprising: an endless band-saw blade having a plurality of teeth; a band-saw blade guiding apparatus that guides tooth tips on the band-saw blade toward a workpiece to be cut; and a vibration applying unit that is provided on the band-saw blade guiding apparatus, for applying vibrations of the band-saw blade on the workpiece in a cutting direction to the band-saw blade.

A fifth aspect of the present invention provides the band-saw machine according to the fourth aspect, wherein the vibration applying unit includes a non-circular rotating member that can press a back portion of the band-saw blade directly or indirectly.

A sixth aspect of the present invention provides the band-saw machine according to the fourth aspect, wherein the vibration applying unit includes a hammer that can hit a back portion of the band-saw blade directly or indirectly.

A seventh aspect of the present invention provides the band-saw machine according to the fourth aspect, wherein the vibration applying unit is configured so as to vibrate a backup holding member including a back portion pressing member that can press a back portion of the band-saw blade.

To achieve the above object, an eighth aspect of the present invention provides a band-saw machine comprising: an endless band-saw blade having a plurality of teeth; a plurality of band-saw blade guiding apparatuses that guide tooth tips on the band-saw blade toward a workpiece to be cut, where one of the band-saw blade guiding apparatuses is provided so as to be movable in a direction of approaching to and separating from the other one; and vibration applying units that are provided on the plurality of band-saw blade guiding apparatuses, for applying vibrations of the band-saw blade on the workpiece in a cutting direction, wherein the respective vibration applying units are coupled to each other via a power transmission unit.

Accordingly, according to the present invention, since cutting of a workpiece is performed by applying vibrations in a cutting direction of the band-saw blade with respect to the workpiece to the band-saw blade, a form where all teeth of the band-saw blade corresponding to the workpiece can cut in the workpiece is made, so that efficient cutting can be performed.

Since chips are finely divided, discharge property of the chips is improved, and since heat generation due to cutting resistance and heat radiation are alternately repeated, temperature of the band-saw blade and the workpiece is prevented from being higher. Accordingly, elongation of life of the band-saw blade can be achieved.

BRIEF DESCRIPTION OF THE DRAWINGS

FIG. 3(A) and FIG. 3(B) are explanatory diagrams of a configuration for applying vibrations in a cutting direction to a band-saw blade provided in the band-saw machine and of an operation of the saw blade;

FIG. 5(A) and FIG. 5(B) are explanatory diagrams showing configurations for applying vibrations in a cutting direction to the band-saw blade;

FIG. 6(A) and FIG. 6(B) are explanatory diagrams showing configurations for applying vibrations in a cutting direction to the band-saw blade;

FIG. 12 is an explanatory diagram showing a configuration for applying vibrations in a cutting direction to a band-saw blade according to another embodiment.

BEST MODE(S) FOR CARRYING OUT THE INVENTION

Preferred embodiments of the present invention will be explained below based on FIG. 1 to FIG. 12.

Figure 1:
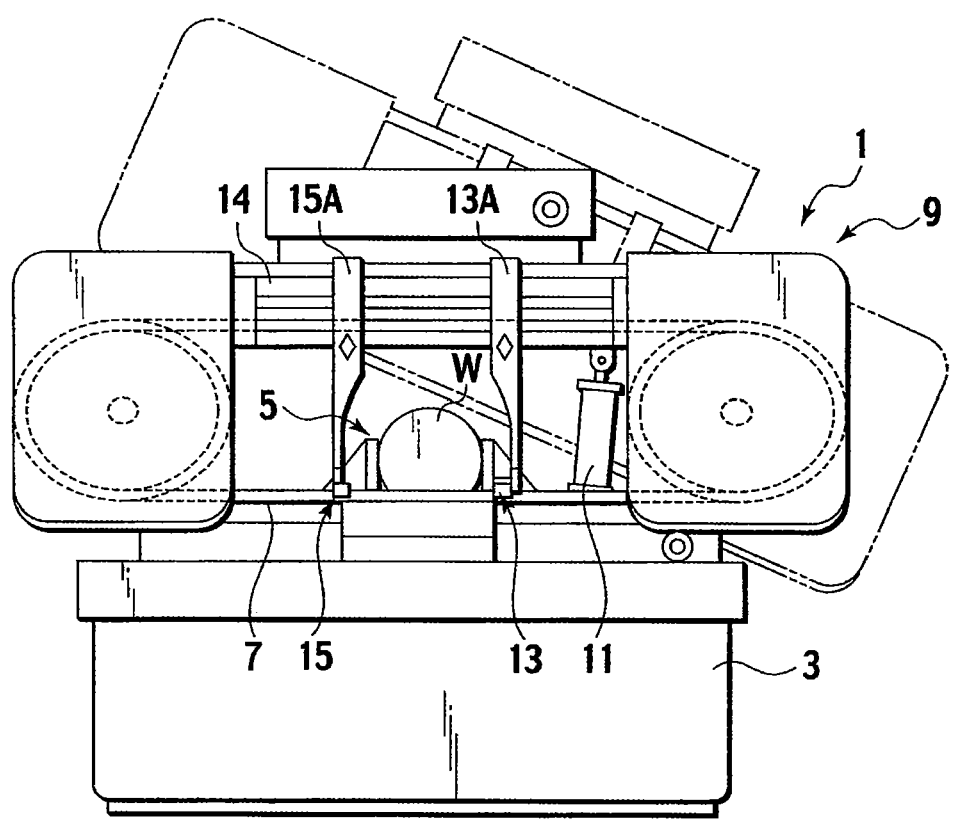
FIG. 1 is an explanatory front view showing an entire configuration of a horizontal band-saw machine as one example of a band-saw machine.
Figure 2:
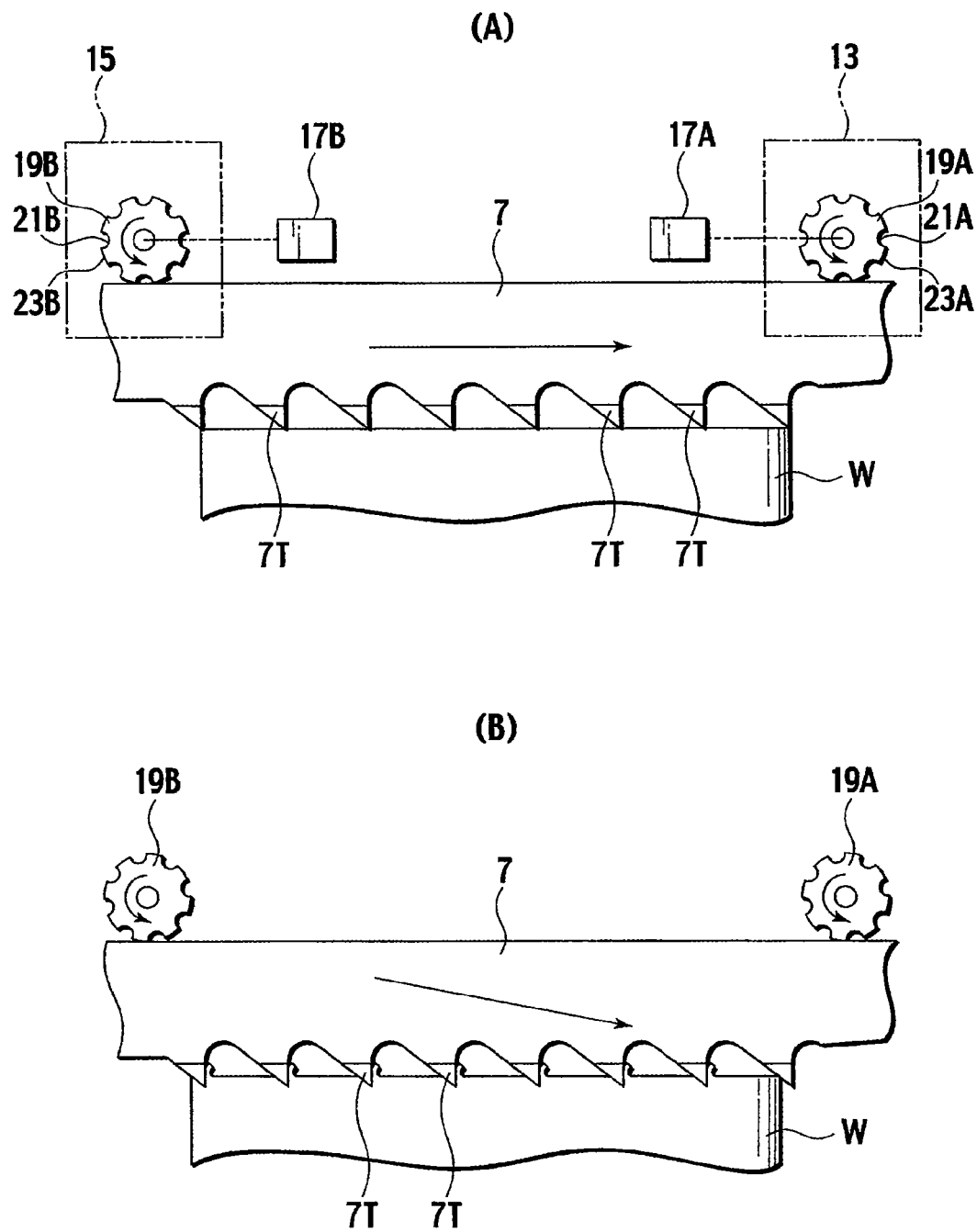
FIG. 2(A) and FIG. 2(B) are explanatory diagrams of a configuration for applying vibrations in a cutting direction to a band-saw blade provided in the band-saw machine and of an operation of the saw blade.
Figure 4:
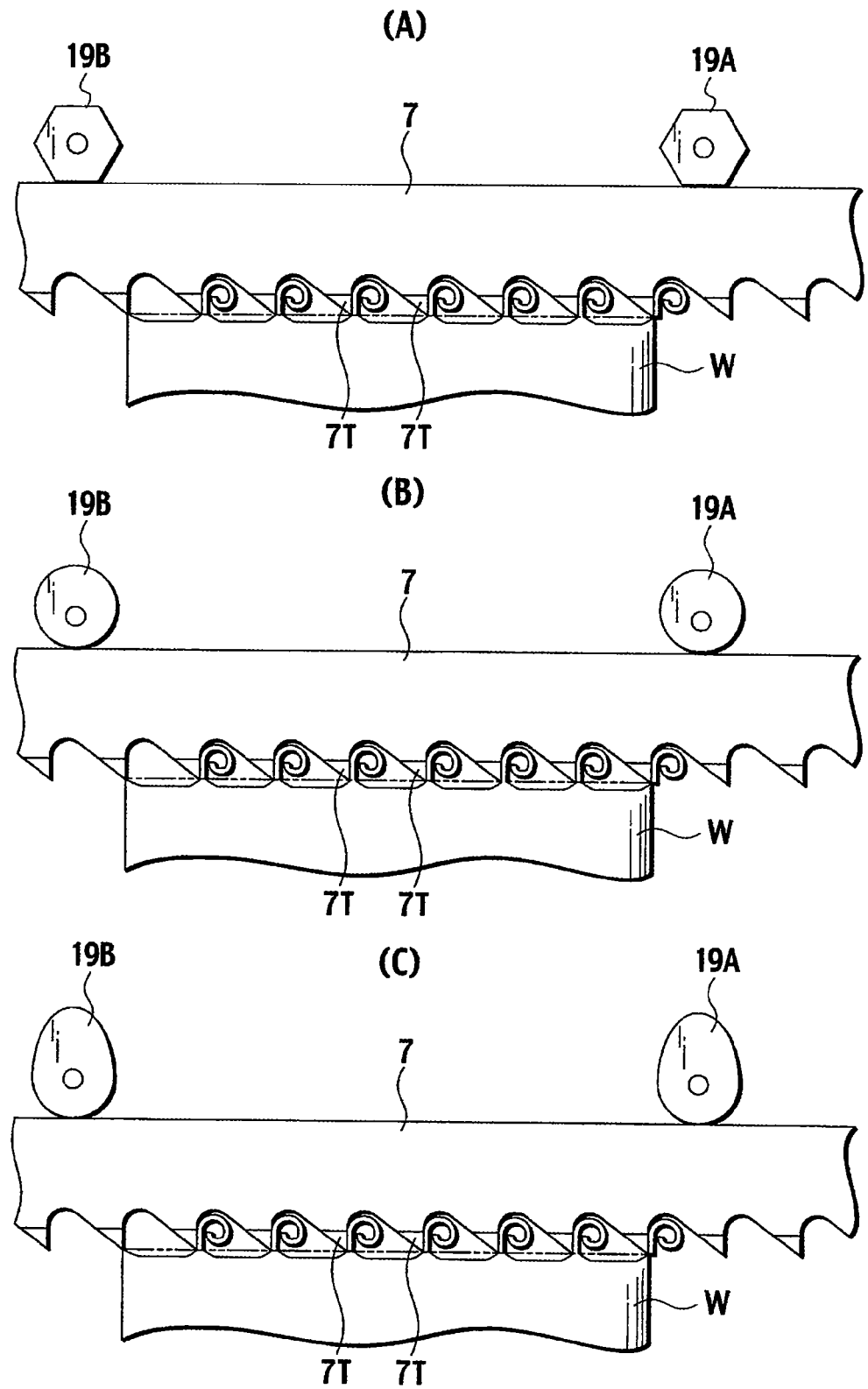
FIG. 4(A) to FIG. 4(C) are explanatory diagrams showing various configurations for applying vibrations in a cutting direction to the band-saw blade.
Figure 7:
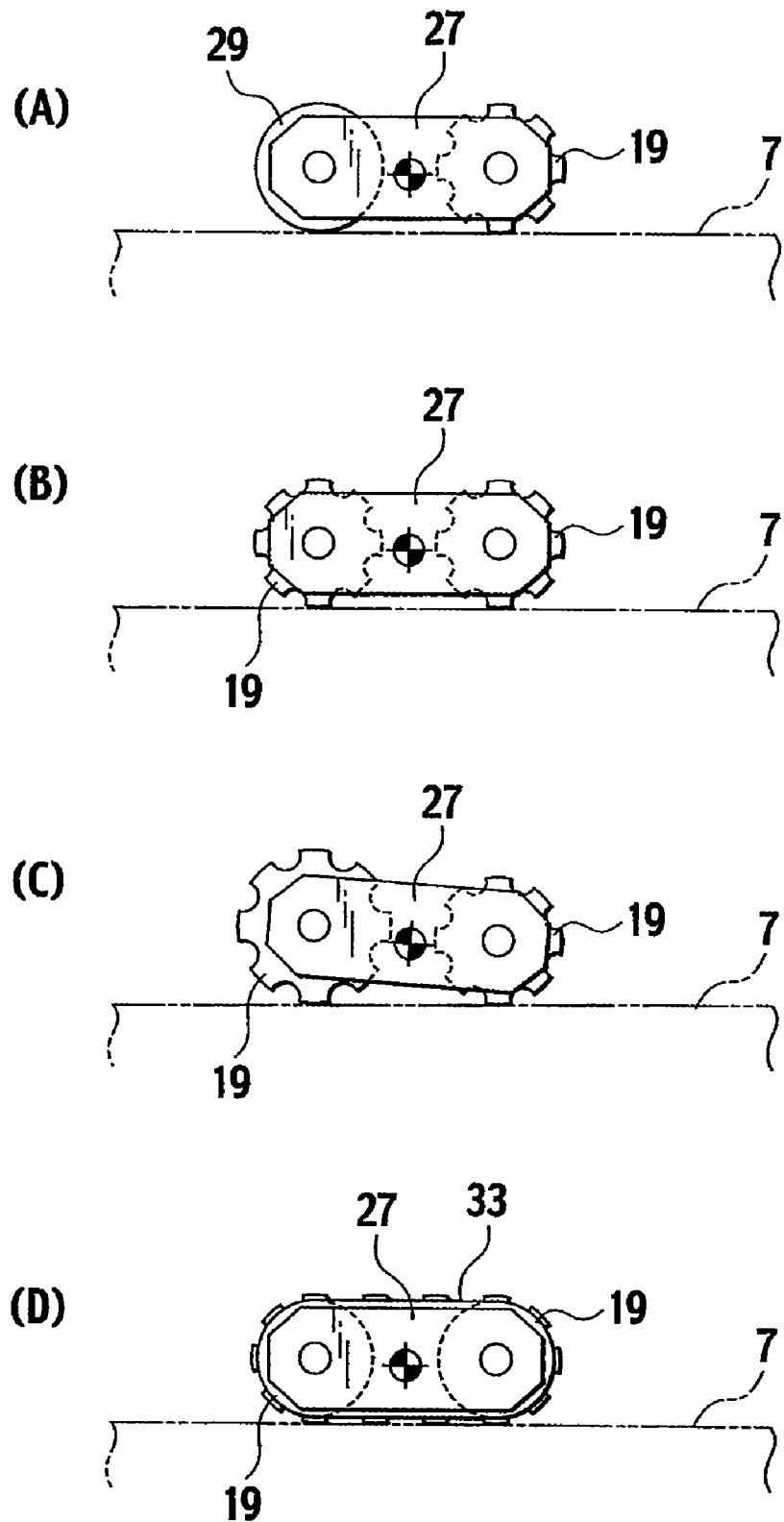
FIG. 7(A) to FIG. 7(D) are explanatory diagrams showing configurations for applying vibrations in a cutting direction to the band-saw blade.

First, with reference to FIG. 1, a band-saw blade 1 includes a base frame 3, and the base frame 3 includes a vice device 5 that can fix a workpiece W to be cut. A saw-blade frame 9 including an endless band-saw blade 7 is provided on the base frame 3 so as to be movable in relative directions of approaching to and separating from the workpiece W, and an actuator 11 for a cutting operation such as a hydraulic cylinder for moving the saw-blade frame 9 is also provided thereon. Further, guide arms 13A, 15A including band-saw guiding apparatuses 13, 15 for guiding tooth tips on the band-saw blade 7 toward the workpiece W at their distal ends (lower ends) are provided on the saw blade housing 9. As is well known, the guide arms 13A, 15A are supported by a guide beam 14 provided on the saw blade housing 9, where one guide arm 13A is fixed on the guide beam 14. The other guide arm 15A is provided such that its position can be adjusted in directions of approaching to and separating from the guide arm 13A corresponding to the size of the workpiece W. Since the configuration of this type of band-saw machine is well known, detailed explanations thereof will be omitted.

In thus configured band-saw machine 1, the band-saw blade 7 is driven and run, in a state that the band-saw blade 7 is separated from the workpiece W according to an operation of the actuator 11, and the saw blade housing 9 is moved in a cutting direction of the band-saw blade 7 to the workpiece W according to an operation of the actuator 11, so that cutting of the workpiece W is performed by the band-saw blade 7.

When cutting of the workpiece W is performed by driving and running the band-saw blade 7 as described above, and moving the band-saw blade 7 in a cutting direction with respect to the workpiece W, the band-saw blade 7 is guided and supported by the band-saw blade guiding apparatuses 13, 15 at both sides of the workpiece W. Accordingly, the band-saw blade 7 is put in a state that it is resiliently deformed and slightly bent due to a reaction force against cutting resistance from the workpiece W between the band-saw blade guiding apparatuses 13, 15. When there are slight differences in height among respective saw-teeth on the band-saw blade 7 due to a manufacturing error or the like, there may be some teeth that do not contribute to cutting of the workpiece W.

In the present embodiment, it is configured that vibration applying units are provided on the band-saw blade guiding apparatuses 13, 15, and vibrations to the workpiece W in cutting direction are applied to the band-saw blade 7 by the vibration applying units. In more detail, the band-saw guiding apparatuses 13, 15 clamp a barrel portion of the band-saw blade 7 from its both sides and abut on a back portion of the band-saw blade 7 to support the band-saw blade 7, thereby guiding tooth tips of the band-saw blade 7 toward the workpiece W. The band-saw guiding apparatuses 13, 15 include rotating members 19A, 19B rotated (revolved) by rotating actuators 17A, 17B such as motors, as shown conceptually and schematically in FIG. 2(A) and FIG. 2(B).

The rotating members 19A, 19B rotate while abutting on the back portion of the band-saw blade 7, and are formed in a non-circular shape where recessed portions (portions with a small radius from a rotational center, namely, portions with a small distance from the rotational center to a contact point on the band-saw blade 7) 21A, 21B and projecting portions (portions with a large radius from the rotational center, namely, portions with a large distance from the rotational center to the contact point on the band-saw blade 7) 23A, 23B are provided at approximately equal pitches.

Accordingly, as shown in FIG. 2(A), the recessed portions 21A, 21B in the respective rotating members 19A, 19B are opposed to the back portion of the band-saw blade 7, and while the band-saw blade 7 runs (moves), for example horizontally, to perform cutting of the workpiece W in this state, the projecting portions 23A, 23B of the rotating members 19A, 19B are opposed to the back portion of the band-saw blade 7 by rotating the rotating actuators 17A, 17B synchronously, so that the band-saw blade 7 is pressed in a cutting direction of the band-saw blade 7 by the projections 23A, 23B of the rotating members 19A, 19B. Therefore, the band-saw blade 7 actively conducts cutting of the workpiece W (see FIG. 2(B)).

When both of the projections 23A, 23B of the rotating members 19A, 19B abut on the back portion of the band-saw blade 7, the band-saw blade 7 is again moved horizontally, so that cutting of the workpiece W is progressed by respective teeth on the band-saw blade 7, as shown in FIG. 3(A). At this time, heat is generated due to cutting resistance.

Next, when the rotating members 19A and 19B are further rotated to come into a state shown in FIG. 3(B), the recessed portions 21A, 21B of the rotating members 19A, 19B are again opposed to the back portion of the band-saw blade 7. At this time, it is in a state that pressure from the band-saw blade 7 is temporarily released, and the band-saw blade 7 moves so as to be slightly separated from the workpiece W (see FIG. 3(B)). When it comes to a state shown in FIG. 3(B), in other words, when the band-saw blade 7 moves so as to be slightly separated from the workpiece W, it acts to remove cut chips from the workpiece W so that the chips are removed from the workpiece W.

In the state shown in FIG. 3(B) to the state shown in FIG. 2(A), generation of heat is suppressed due to relative reduction of the cutting resistance and the heat is radiated, so that the temperature of the band-saw blade 7 and the workpiece W can be prevented from being higher.

As described above, according to the band-saw machine of the present invention, since the recess portions 21A, 21B and the projecting portions 23A, 23B of the rotating members 19a, 19B are alternately opposed to the back portion of the band-saw blade 7 to abut thereto, the band-saw blade 7 is vibrated in the cutting direction with respect to the workpiece W. Therefore, when a cutting operation is performed by the band-saw blade 7 while the saw blade frame 9 is being moved in the cutting direction to the workpiece W with respect thereto, the cutting operation of the band-saw blade 7 on the workpiece W is performed with impact, and fast and slight movement of the band-saw blade 7 in a separating direction from the workpiece W is repeated by vibrating the band-saw blade 7 in the cutting direction.

Therefore, when the band-saw blade 7 is pressed and moved in the direction of the workpiece W by the rotating members 19A, 19B, all the saw-teeth 7T opposed to the workpiece W are put in a cutting form, and cutting of the workpiece W is performed effectively, so that efficient cutting work can be performed. When the band-saw blade 7 is moved to be separated from the workpiece W slightly, it acts to remove cut chips from the workpiece W so that the chips are removed from the workpiece W, which results in reduction of the cutting resistance. Accordingly, discharge property of chips is improved due to fine divisions of the chips, and heat generation due to the cutting resistance can be easily suppressed. Accordingly, elongation of life of the band-saw blade 7 can be achieved.

Note that, in the above explanation, the case where the recessed portions 21A, 21B or the projecting portions 23A, 23B of the rotating members 19A, 19B are simultaneously opposed and pressed to the back portion of the band-saw blade 7 has been explained. However, it is also possible to adopt a configuration where the recess portion of one rotating member of the rotating members 19A, 19B and the projecting portion of the other rotating member are simultaneously opposed to the back portion of the band-saw blade 7. That is, it is possible to rotate the left and right rotating members 19A, 19B at phases different from each other, or rotate the left and right rotating members 19A, 19B at rotational numbers different from each other. Even in these cases, vibrations in the cutting direction can be applied to the band-saw blade 7, so that the above described effects can be achieved.

It is desirable that an amplitude of vibrations of the band-saw blade 7 to the workpiece W in the cutting direction is in a range of about 0.03 to 0.5 mm in view of a band-saw width precision due to a manufacturing error of the band-saw blade 7. That is, when a cutting operation of the workpiece W by the band-saw blade 7 is performed, cutting of the saw-teeth 7T on the band-saw blade 7 to the workpiece W is conducted effectively by vibrating the band-saw blade 7 in the cutting direction. However, when a cutting amount is excessively large, load acting on the saw-teeth 7T becomes large, and chipping of a tooth can occur in some cases. In order to make almost all the saw-teeth 7T contribute to cutting of the workpiece W, it is desirable that vibrations are generated with such an extent of amplitude in which an error in the band-saw width precision can be absorbed.

While a frequency of the vibrations in the cutting direction applied to the band-saw blade 7 depends on the magnitude of a running velocity of the band-saw blade 7, it is preferably set to a range from several Hz to several hundreds Hz. That is, the number of repetitions of cutting of the respective saw-teeth 7T to the workpiece W is increased and a cutting length of the workpiece W per one tooth of the band-saw blade 7 is decreased according to increase of the frequency. Accordingly, generated chips become shorter, and discharge property is improved. However, the number of repetitions of cutting of the saw-teeth 7T to the workpiece W with impact and application of large load to the workpiece W due to cutting resistance is increased. Therefore, with life reduction due to repetitive load acting on the respective saw-teeth 7T on the band-saw blade 7 in consideration, it is desirable that the frequency is set in a range of several Hz to several hundreds Hz. When the band-saw blade 7 has a configuration where carbide chips or the like are brazed to tooth tips, increase in frequency is not desirable, because missing of the carbide chip due to application of load with impact thereto is promoted.

When a relationship between the running velocity of the band-saw blade 7 and the number of vibrations thereof in the cutting direction have a certain relationship, as shown in FIGS. 2(A), 2(B) and FIGS. 3(A), 3(B), each time when the saw-teeth 7T move by a distance corresponding to about one pitch of the saw-teeth 7T on the band-saw blade 7, cutting due to vibrations of the band-saw blade 7 to the workpiece W is repeated, so that lengths of chips become approximately equal to the pitch of the saw-teeth 7T. That is, the lengths of the chips thus generated become considerably short as compared with the lengths of chips generated at an ordinary cutting time where vibrations are not applied in the cutting direction of the band-saw blade 7 with respect to the workpiece W or at a vibration-cutting time. Accordingly, the discharge property of chips is improved.

Cutting of the saw-teeth 7T to the workpiece W is performed by applying vibrations in the cutting direction of the band-saw blade 7, as shown in FIG. 2(B), FIG. 3(A), biting property of respective tooth 7T to the workpiece W is improved, where even a workpiece having a tendency of exhibiting work hardening is cut from its portion below a work hardening layer thereof, so that cutting work can be easily performed.

As a configuration for applying vibrations to the band-saw blade 7 in the cutting direction, as shown in FIG. 4(A), the rotating members 19A, 19B can be formed in a polygonal shape, or as shown in FIGS. 4(B), 4(C), the rotating members 19A, 19B can be formed as an eccentric cam or an eccentric roller with an appropriate shape. That is, when the rotating members 19A, 19B rotated by the actuators are formed in a non-circular shape, various shapes can be adopted therefor. Also, a pair of rotating members 19A, 19B can be formed in a different shape from each other.

As shown in FIG. 5, it is also possible to adopt a configuration where backup rollers 29 that abut on the back portion of the band-saw blade 7 to restrict movement toward the back portion are rotatably provided on a swinging lever 27 provided so as to be swingable about a pivoting shaft 25 in the band-saw blade guiding apparatus 13, 15, and a non-circular rotating member 19 is caused to abut on the backup roller 29. According to this configuration, vibrations in the cutting direction can be indirectly applied to the band-saw blade 7 via the backup roller 29, due to the rotations of the rotating member 19 caused by the actuator 17.

As shown in FIG. 6(A), it is also possible to adopt a configuration where one end of the swinging lever 27 is extended and a rotating member 19 rotated by the actuator is provided at the swinging lever 27. In this case, as shown in FIG. 6(B), a configuration where a backup chip 31 is provided on the swinging lever 27 instead of the backup roller 29 can be also adopted.

As shown in FIG. 7(A), it is also possible to adopt a configuration where the backup roller 29 is provided on one end of the swinging lever 27 and a rotating member 19 rotated by the actuator is provided on the other end thereof. As shown in FIG. 7(B), a configuration where rotating members 19 are provided at both ends of the swinging lever 27 can be also adopted. In this case, as shown in FIG. 7(C), a configuration where both rotating members 19 are set to have different diameters can be also adopted. Further, as shown in FIG. 7(D), a configuration where a belt 33 with projecting portions disposed on an outer peripheral face thereof at appropriate intervals are wound around backup rollers 29 can be also adopted.

That is, various configurations can be adopted as the configuration for applying vibrations in the cutting direction to the band-saw blade 7 by a rotating member rotated by an actuator.

Figure 8:
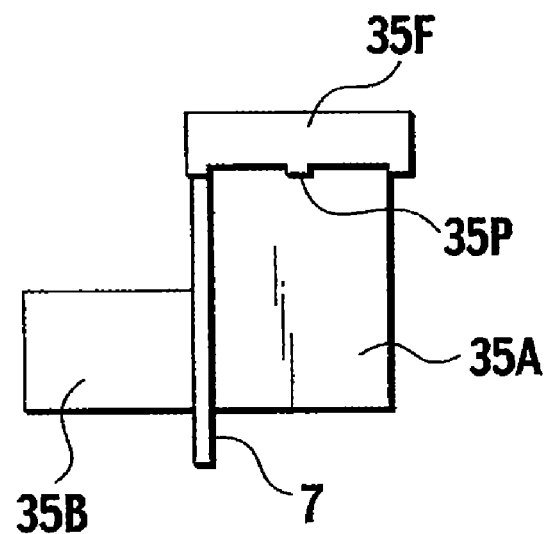
FIG. 8 is an explanatory diagram showing a configuration for applying vibrations in a cutting direction to the band-saw blade.

Further, as the configuration where vibrations in the cutting direction are applied to the band-saw blade 7, a configuration such as the one shown in FIG. 8 can be also adopted. That is, it is configured that a flange portion 35F that abuts on the back portion of the band-saw blade 7 to support the band-saw blade 7 is provided on one of a pair of guide rollers 35A, 35B clamping the band-saw blade 7 from both sides thereof to guide the same and projecting portions 35P are provided on a portion of the flange portion 35F that abuts on the back portion of the band-saw blade 7 to support the band-saw blade 7 at appropriate intervals is adopted in the band-saw blade guiding apparatus. According to this configuration, it is in a state that the band-saw blade 7 is pressed downwardly each time when the back portion of the band-saw blade 7 is supported by the projecting portion 35P, so that vibrations in the cutting direction can be applied to the band-saw blade 7.

Figure 9:
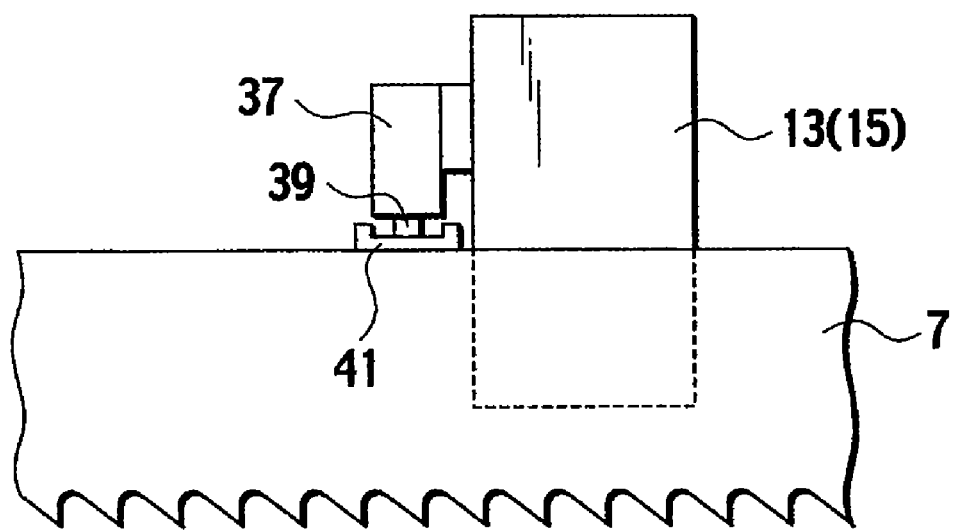
FIG. 9 is an explanatory diagram showing a configuration for applying vibrations in a cutting direction to the band-saw blade.

Further, as the configuration where vibrations in the cutting direction are applied to the band-saw blade 7, as shown in FIG. 9, it is also possible to adopt a configuration where an actuator 37, for example a solenoid or a mini-cylinder, is provided in the band-saw blade guiding apparatus 13, 15, and the back portion of the band-saw blade 7 is directly or indirectly hit by an operation lever 39 provided on the actuator 37 so as to reciprocate, or hit by a hammer 41 provided at a distal end of the operation lever 39.

According to the above configuration, an operation cycle of the actuator 37 can be changed arbitrarily, and a biting force of the saw-teeth on the band-saw blade 7 to the workpiece can be controlled by controlling output of the actuator 37. Further, by controlling a stroke amount of the operation lever 39, amplitude of the vibrations in the cutting direction applied to the band-saw blade 7 can be controlled. Therefore, according to the configuration, the number of vibrations of the band-saw blade 7 in the cutting direction, the amplitude of the vibrations, and a cutting force (a vibrating force) of the band-saw blade 7 can be controlled corresponding to the material, the shape, the size and the like of a workpiece.

To summarize, in the present embodiment, as understood from the above explanations, the vibration applying units are provided on the band-saw blade guiding apparatuses 13, 15 that hold and guide the band-saw blade 7 so as to direct the tooth tips on the band-saw blade 7, or provided close to the band-saw blade guiding apparatuses 13, 15, and cutting of the workpiece W is conducted by applying vibrations of the band-saw blade 7 in the cutting direction to the workpiece W utilizing the vibration applying units. Therefore, even if there are some differences in height among the saw-teeth 7T on the band-saw blade 7, all of the saw-teeth 7T on the band-saw blade 7 contribute to cutting of the workpiece W, so that efficient cutting can be conducted.

As described above, since cutting property of the saw-teeth on a workpiece is improved by vibrating the band-saw blade 7 in the cutting direction, even a workpiece having a tendency of exhibiting work hardening can be cut favorably and lengths of chips generated during cutting of the workpiece can be shortened, so that discharge property of chips can be improved.

The present invention is not limited to the embodiments described above, and can be embodied in other various forms by appropriate modifications. That is, in the above explanations, the effect that the rotating members 19a, 19B are rotationally driven by the rotating actuators 17A, 17B such as motors has been explained. However, it can be configured that the rotating members 19A, 19B are rotated according to rotations of the band-saw blade 7, without using the rotating actuators.

Figure 10:
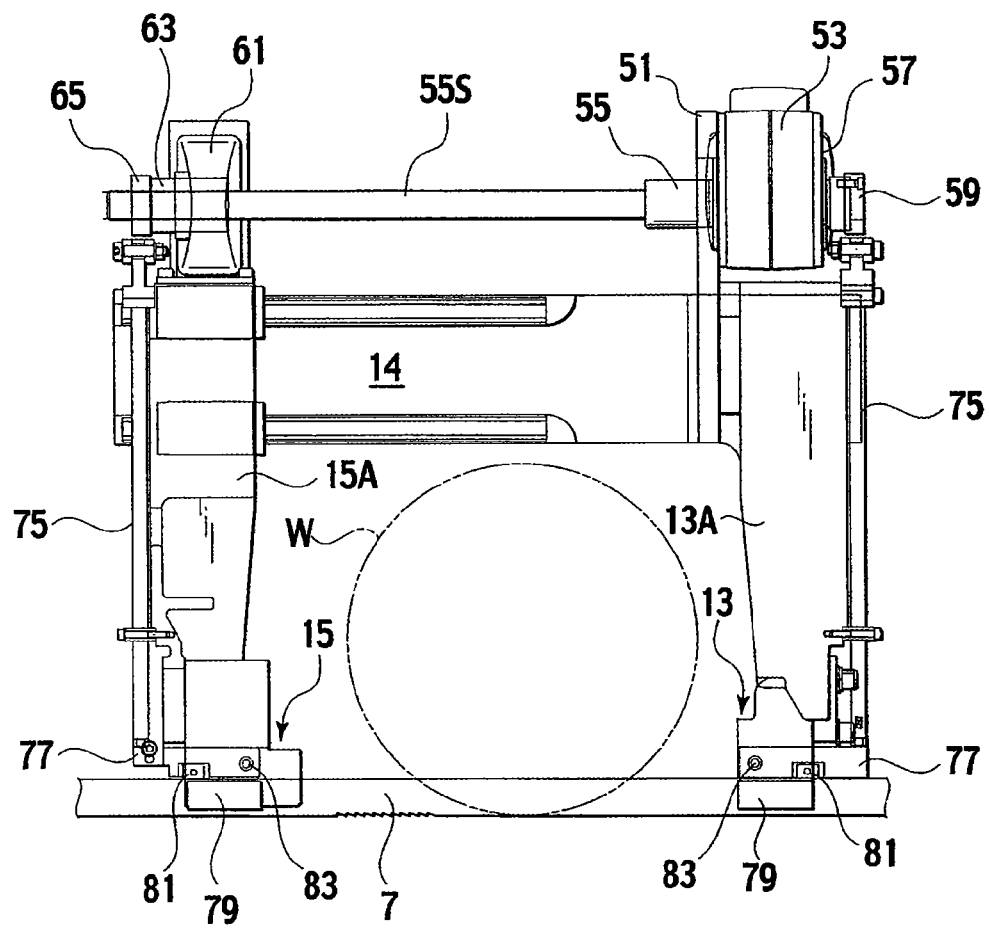
FIG. 10 is an explanatory diagram showing a configuration for applying vibrations in a cutting direction to a band-saw blade according to another embodiment.
Figure 11:
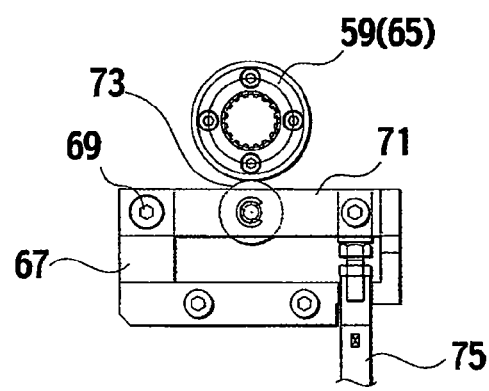
FIG. 11 is a side explanatory diagram of main parts for applying vibrations in a cutting direction to a band-saw blade.

FIG. 10 shows another embodiment. In this embodiment, a rotational shaft 55 is rotatably supported to a gearbox 53 attached on an upper portion of one guide arm 13A via a bracket 51. The rotational shaft 55 is rotated by a motor 57 attached on the gearbox 53. Transmission of rotations from the motor 57 to the rotational shaft 55 is performed via a bevel gear mechanism, a worm gear mechanism or the like provided in the gearbox 53.

A cam 59 with an appropriate shape, for example a polygonal shape, is attached to one end of the rotational shaft 55, and a spline shaft 55S extending horizontally toward the other guide arm 15A in parallel with the guide beam 14 is provided on the other end thereof. The spline shaft 55S is spline-fitted in a spline sleeve 63 to be slidable in an axial direction relative to the spline sleeve 63, which is supported to a bearing 61 provided on an upper portion of the guide arm 15A such that only rotations thereof are allowed. A cam 65 similar to the cam 59 is attached to the other end of the spline sleeve 63.

Brackets 67 (see FIG. 11) are provided on upper portions of the guide arms 13A, 15A corresponding to the cams 59, 65, and swinging arms 71 are supported to the brackets 67 via pivoting shafts 69 so as to be vertically swingable. Cam followers 73 pressed downwardly by the respective arms 59, 65 are rotatably provided on the respective swinging arms 71. Upper end portions of pressing rods 75 supported by the respective guide arms 13A, 15A to be movable vertically abut on lower faces of distal ends of the respective swinging arms 71.

Lower ends of the respective pressing rods 75 abut on backup holding members 77 provided on the band-saw blade guiding apparatuses 13, 15. That is, clamping members 79 for clamping and guiding the band-saw blade 7 from both sides thereof are provided on the band-saw blade guiding apparatuses 13, 15, like ordinary band-saw blade guiding apparatuses. A proximal end portion of the backup holding member 77 including a back portion pressing member 81 such as a backup or a backup roller that can press the back portion of the band-saw blade 7 is pivoted via a pivoting shaft 83 to be vertically rotatable, and a distal end portion (a lower end portion) of the pressing rod 75 abuts on a distal end of the backup holding member 77 so as to press the back portion pressing member 81 toward the band-saw blade 7.

With the above configuration, the cams 59, 65 on the sides of the guide arms 13A, 15A are simultaneously rotated by the rotational shaft 55 that is one example of a power transmission unit. Accordingly, when the respective swinging arms 71 are swung downwardly via the respective cam followers 73 according to rotations of the cams 59, 65, the backup holding members 77 are pressed toward the band-saw blade 7 by the distal end portions of the respective pressing rods 75. Accordingly, when pressings from the cams 59, 65 are released (when recesses of the cams 59, 65 correspond to the cam followers 73), it comes to a state that the band-saw blade 7 and the pressing rods 75 are returned back due to cutting resistance in a principal component force (a back component force).

That is, in the configuration, cutting of a workpiece can be performed by applying vibrations in the cutting direction to the band-saw blade 7.

As the configuration for applying vibrations of the band-saw blade 7 on a workpiece in the cutting direction to the band-saw blade 7, it is also possible to adopt a configuration where a cam follower CF provided on the backup holding member 77 is moved vertically by an appropriate cam C such as a cylindrical cam or a face cam rotated by a motor M provided on the guide arm 13A (15A), as shown in FIG. 12. Further, a configuration where a supporting block 85 including a backup roller 29 or the like is moved vertically by an actuator AC such as a hydraulic cylinder or a solenoid can be also adopted.

As the configuration of applying vibrations of the band-saw blade 7 on a workpiece in the cutting direction to the band-saw blade 7, it is also possible to adopt a configuration where the guide beam 14 supporting the guide arms 13A, 15A is vibrated vertically (the cutting direction of the band-saw blade 7) by an appropriate actuator, or a configuration where the saw blade housing 9 is vibrated by driving the actuator 11 for a cutting operation in a vibrating manner so that vibrations are applied to the band-saw blade 7 in the cutting direction. It is also possible to adopt a configuration where a motor including an eccentric weight is attached to the saw blade housing 9, the saw blade housing 9 is vibrated by rotating the motor, and vibrations of the band-saw blade 7 on a workpiece in the cutting direction are applied to the band-saw blade 7 by the vibrations.

That is, as the configuration for applying vibrations of the band-saw blade 7 on a workpiece in the cutting direction to the band-saw blade 7, it is possible to adopt various configurations, such as a configuration for directly applying vibrations to the band-saw blade 7, or a configuration for applying vibrations to a configuration supporting the band-saw blade 7 to indirectly apply vibrations to the band-saw blade 7.

The present invention is not limited to the above and aforementioned embodiments of the invention, and can be embodied in other various forms by appropriate modifications.

The invention claimed is:

1. A band-saw machine comprising:
   an endless band-saw blade having a plurality of teeth having tooth tips;
   a band-saw blade guide apparatus that is configured to guide the tooth tips on the band-saw blade toward a workpiece to be cut; and a vibration applying mechanism provided on the band-saw blade guide apparatus which is configured to apply vibrations to the band-saw blade in a cutting direction with respect to the workpiece, wherein a frequency of the vibrations and a running velocity of the band-saw blade are set, such that a single oscillation of the vibrations occurs substantially in a time that a tooth moves by one tooth pitch.

2. The band-saw machine according to claim 1, wherein the vibration applying mechanism includes a non-circular rotating member that is configured to press a back portion of the band-saw blade.

3. The band-saw machine according to claim 2, wherein the non-circular rotating member is configured to press the back portion of the band-saw blade directly.

4. The band-saw machine according to claim 2, wherein the non-circular rotating member is configured to press the back portion of the band-saw blade indirectly.

5. The band-saw machine according to claim 1, wherein the frequency of the vibrations and the running velocity of the band-saw blade are set such that the lengths of the generated chips are approximately equal to the pitch of the teeth, regardless of the relationship between the pitch of the teeth and a workpiece length, width and thickness.

6. The band-saw machine according to claim 1, wherein the vibration applying mechanism includes a hammer that is configured to contact a back portion of the band-saw blade.

7. The band-saw machine according to claim 6, wherein the hammer is configured to contact the back portion of the band-saw blade directly.

8. The band-saw machine according to claim 6, wherein the hammer is configured to contact the back portion of the band-saw blade indirectly.

9. The band-saw machine according to claim 1, wherein
the vibration applying mechanism is configured to vibrate a backup holding member including a back portion pressing member that is configured to press a back portion of the band-saw blade.

10. The band-saw machine according to claim 9, wherein the band-saw blade guide apparatus comprises a pair of band-saw blade guides, the vibration applying mechanism comprises a pair of vibration applying mechanisms respectively provided on the pair of band-saw blade guide apparatuses, the pair of vibration applying mechanisms simultaneously apply vibrations to the band-saw blade, and the tooth tips of the band-saw blade thereby simultaneously approach the workpiece in the cutting direction, and the band-saw blade approaches the workpiece at a speed not smoothly accelerated so as to cut the workpiece and temporarily moves away from the workpiece at a speed not smoothly accelerated so as to remove cut chips from the workpiece.

* * * * *